United States Patent [19]

Angus

[11] 3,820,071

[45] June 25, 1974

[54] CREDIT CARD RISK EVALUATION SYSTEMS

[76] Inventor: David R. Angus, R.D. 1-463 Old Reaville Rd., Flemington, N.J. 08822

[22] Filed: June 19, 1970

[21] Appl. No.: 48,931

Related U.S. Application Data

[63] Continuation of Ser. No. 667,764, Sept. 14, 1967, abandoned.

[52] U.S. Cl............................ 340/149 A, 179/2 CA
[51] Int. Cl...................... H04q 9/00, H04m 11/08
[58] Field of Search....... 340/152, 149 A; 179/2 CA

[56] References Cited
UNITED STATES PATENTS

| | | | |
|---|---|---|---|
| 3,296,371 | 1/1967 | Fox | 340/152 X |
| 3,308,238 | 3/1967 | Brothman et al. | 340/152 X |
| 3,345,612 | 10/1967 | Goldman | 340/152 X |
| 3,534,171 | 10/1970 | Shepard et al. | 340/152 X |

Primary Examiner—Donald J. Yusko
Attorney, Agent, or Firm—Sandoe, Hopgood and Calimafde

[57] ABSTRACT

A system including an automatic credit card reader and tone transmitter for transmitting identification of a credit card to a tone decoder and transmitter for retransmission to a computer at which the credit rating is determined, and from which an appropriate signal is retransmitted to an audio recording unit whereby the system selects the appropriate audio message for presentation to the person interrogating the system. A timing circuit releases equipment upon conclusion of a response by the system. Protection from spurious signals and circuits for checking of signals for the accuracy are employed.

6 Claims, 3 Drawing Figures

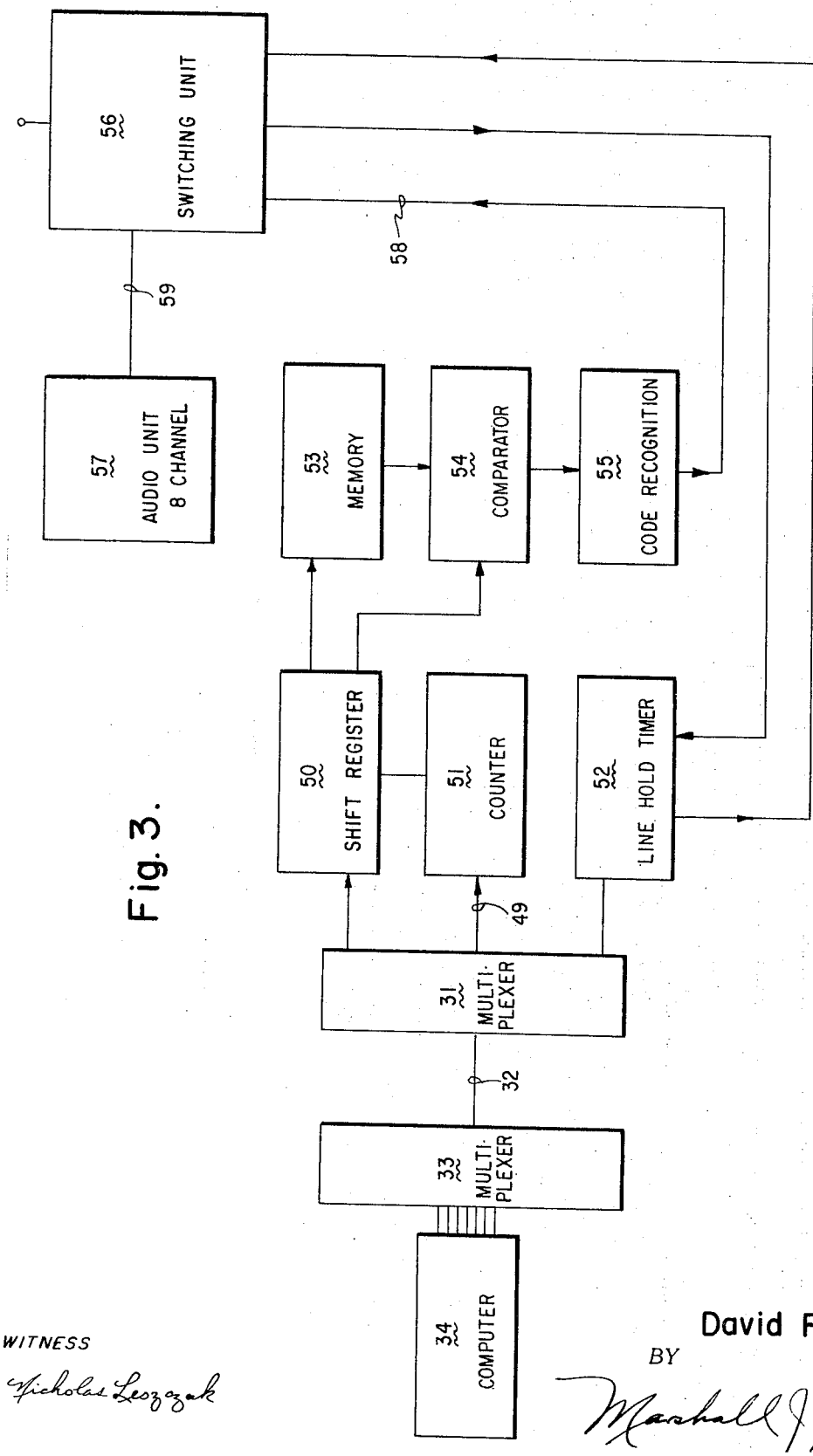

CREDIT CARD RISK EVALUATION SYSTEMS

CROSS REFERENCE TO RELATED APPLICATION

This is a continuation of application Ser. No. 667,764 filed Sept. 14, 1967 and now abandoned.

BACKGROUND OF THE INVENTION

This invention relates to selective electrical communications systems operated by remote equipment.

Previous telephone credit systems have been subject to the weakness of being available for interrogation by those not subscribing to the service because the code system employed was easily compromised and the credit card system did not adequately protect subscribers because of facility of creation of counterfeited credit cards.

The accuracy of transmission of messages over noisy shared lines on the basis of time multiplexing has led to introduction of false bits of information to computers, and accordingly, has led to mistakes in evaluations. The length of time that has been required for voluntary termination of conversations by interrogators on prior systems has led to long queues, delays and losses for competitive systems.

SUMMARY OF THE INVENTION

The invention is a credit card or message evaluation system comprising card reading means for reading coded indicia registered on a credit card and generating a series of electronic signals in response to those indicia, which signals are passed over means for transmitting between the reading means and means for decoding and translating the code into a second code, then the second code is transmitted to a computer adapted to retrieve current information indicated by the indicia as expressed in the second code. The computer then transmits a third signal in response to the retrieved current information and supplies it to an audio playback device for providing several recorded audio messages in response to the character of the third signal. Means are provided for retransmitting selected audio messages to an output device associated with the means for reading. The system is protected from extraneous signals and outputs are checked repeatedly for erroneous transmissions.

BRIEF DESCRIPTION OF THE DRAWINGS

FIG. 3 is a block diagram of a switching and voice unit for use in the system of FIG. 1.

DESCRIPTION OF PREFERRED EMBODIMENT

Each of the encoders, 10, 11, 12, and 13, is a device for generating tones in response to an input. It may be adapted for reading identification on a card, including prepunched holes or other code bearing media which are sensed seriatim causing a series of tones to be generated in a manner corresponding with the arrangement of the prepunched holes. The encoder includes a transducer or connection for coupling the series of tones to one telephone set, such as telephone sets 14, 15, 16, and 17, or other audio transmission devices for ultimate transmission of information to a computer, wherein the message will be analyzed, pertinent stored information reviewed and one of several programmed responses will be produced by the computer.

The encoder can be connected to the computer in several ways. However, the security of the system requires that information stored on the card should be defined in terms of a special code which will tend to deter attempts to compromise the system by means of counterfeited cards or unauthorized means of transmission of tones. Accordingly, a different code from the ASCII (American Standard Code for Information Interchange) code accepted by many computers must be utilized to prevent access and compromise of the system by persons who would be familiar with the well-known ASCII code.

Accordingly, a decoder 27 or code translater from the security code to the ASCII code is required. Although several modes of code changing may be used, in this case, translation is made from two simultaneous tones per interval out of a total of eight tones to the variations of from one to several tones per interval of the ASCII code.

Figure 1:
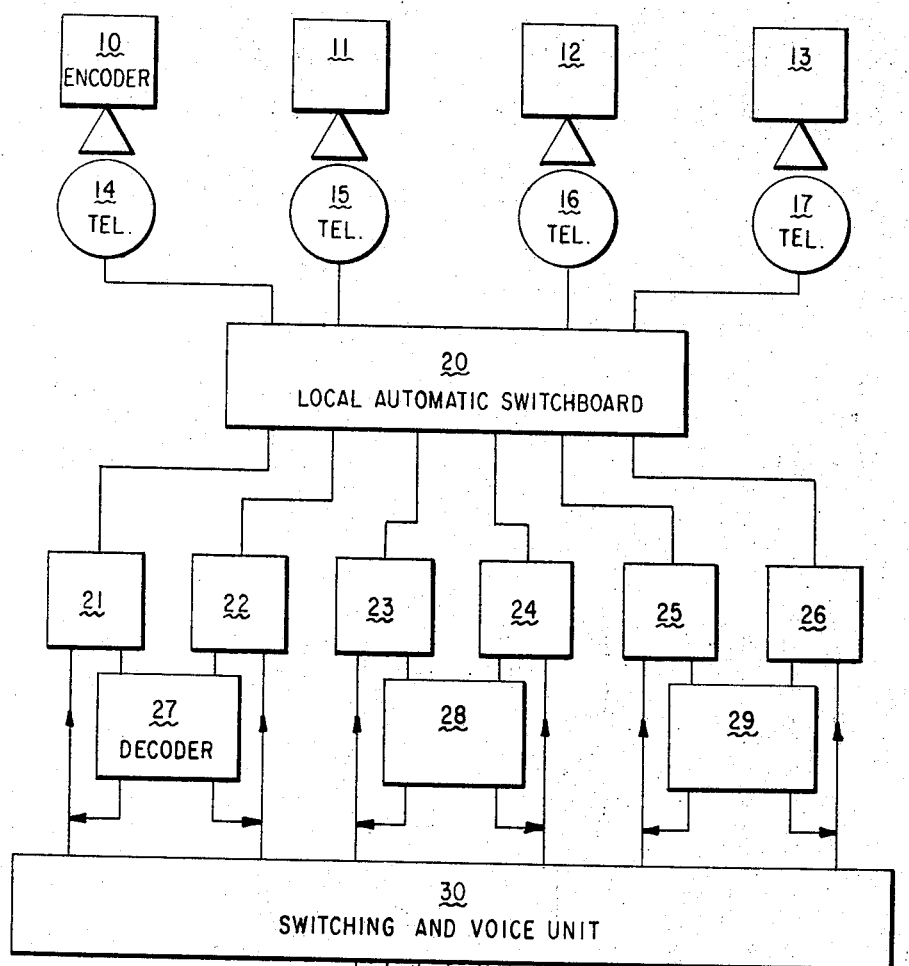
FIG. 1 is a block diagram of the credit card reading and evaluation system of this invention.

In order to reach the decoder in the system shown in FIG. 1, it is necessary to dial into a local automatic switchboard to which a plurality of special telephone stations 21–26 are connected. When a particular special telephone station is reached, then that line is connected to the switching and voice unit 30 which holds an input line to a multiplex data transmission system 30 and a tone is retransmitted back on the line to the particular telephone set 14–17 indicating that the channel is prepared for receiving an input signal. At that point for example, the encoder 10 is activated to read a credit card and to transmit tones through line 14 to local station 26 through the decoder 29 to the switching and voice unit 30 and both multiplexer units 31 and 33, to the computer 34. The multiplexer units 31 and 33 are operated on a non time-sharing basis in which each telephone line, and only that line, is connected to two tone channels of the multiplex units. Upon reversal of the multiplex units when the computer output message is transmitted, the same two tone channels are employed so that the reliability of the system will be maintained and the credit rating obtained will correspond to the credit card being evaluated. This mode of operation tends to reduce noise, cross-talk, incorrect connections on the reply, which could cause false bits of information to be received by the computer or the switching and voice unit 30. This system provides reliability of transmission which is further enhanced by reliability checking devices provided in the switching and voice unit 30. In the computer, the relevant one of the memory banks 35 is scanned, and the information identified by the credit card code is retrieved. In this way the latest evaluation of the credit card account, supplied to the computer 34, can be secured.

In response, the computer 34 will transmit a signal back to the switching and voice unit 30, wherein the voice unit will respond with the appropriate recorded oral message which is then transmitted via station 26 to the telephone 14 where the interrogator is presumably listening.

Figure 2:
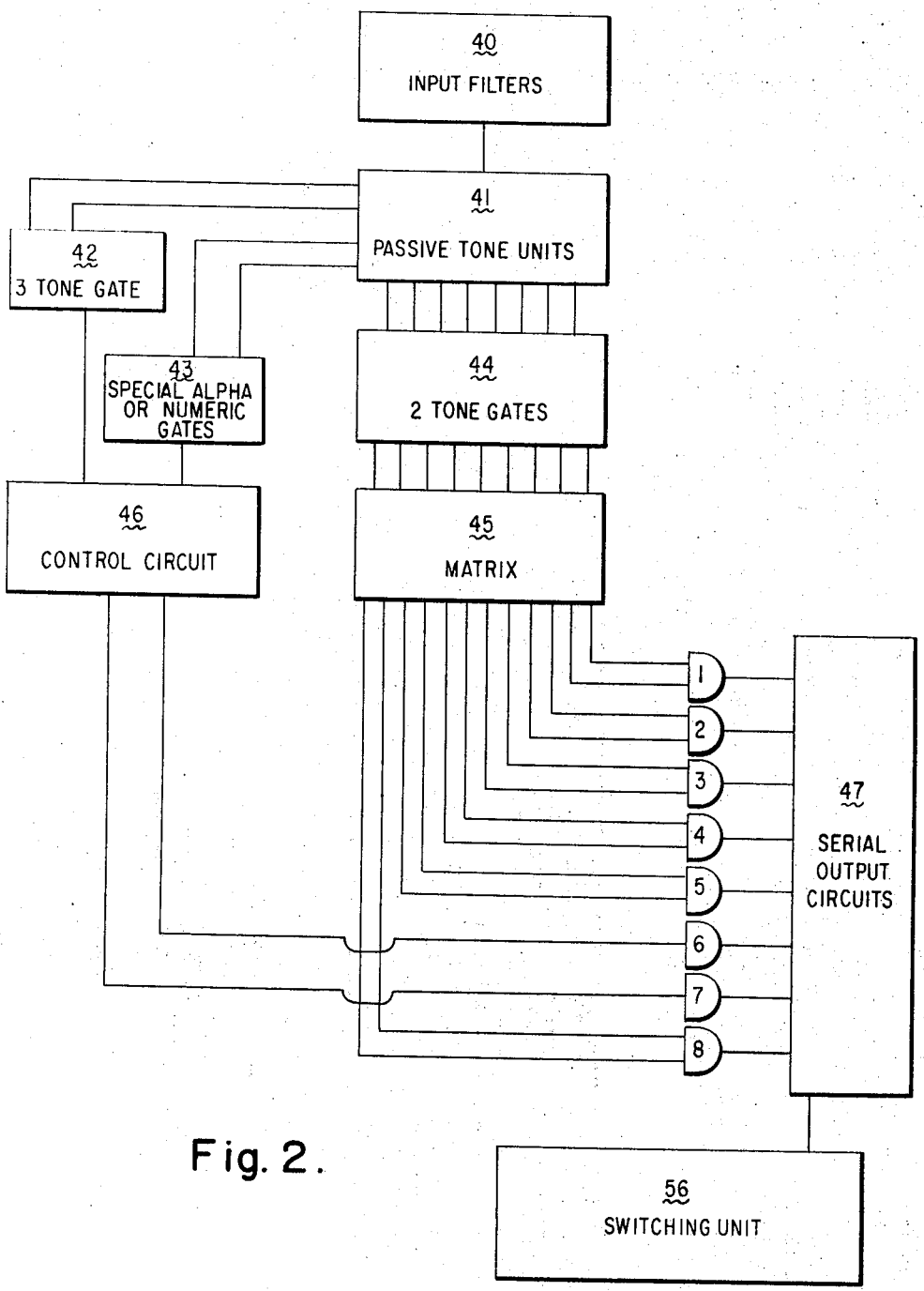
FIG. 2 is a block diagram of a decoder adapted for use in the system of FIG. 1.

FIG. 2 shows the block diagram of a decoder 29. In this case, the input lines to the input filters 40 are connected to the appropriate special telephone 26, etc. The input filters are connected to one of a plurality of passive tone units serving as resonators to amplify the tones received from the card reader. A three tone detector gate 42 is connected to the output of passive tone unit 41 to suppress operation of the system if three tones, rather than two tones, are generated simultaneously by the encoder 10. In the latter case, the control circuit 46 is set to suppress operation of lines 6 and 7 of the ASCII multiplex code when three simultaneous tones are detected so that the multiplexers 31 and 33 will fail to produce either alpha or numeric symbols, which are selected by lines 6 and 7. In addition, the special alpha and numeric gates 43 are also connected to the outputs of passive tone units 41 to control circuit 46 for alternately operating the gates for lines 6 and 7 in response to predetermined pairs of tones.

The passive tone units are connected to a plurality of two input gates so that each pair of tones has a gate. These gates are connected by a crossover matrix 45 to the gates for lines 1–5 and 8 so that the code received at the decoder can be translated into the ASCII code. The gates for lines 1–8 are connected by the serial output circuits 47 to the switching unit 56.

The return signal from the computer is supplied to the switching and voice unit 30, a block diagram of which is shown in FIG. 3. The computer 34 responds to the code identification on the card by generating a character number three times in 8 bit serial ASCII code via the multiplex units 31 and 33 to a shift register 50 where it is recorded. The shift register 40 is synchronized with computer clock pulses at 72 bits per second, supplied over command line 49 to the counter 51, the output of which is supplied to synchronize the shift register 50. The shift register 50 then supplies the character number to the memory 53 and comparator 54, repeatedly, e.g., three times. If the same number is supplied to the comparator 54 and memory 53 all three times, then the message is verified, and the character number signal passes to the code recognition unit 55. The memory 53, the shift register 50, the counter 51, the comparator 54 and the code recognition unit 55 are all employed to check accuracy in order to sense any errors in data which might arise as the result of hum on the line, incorrect bits of data and the like so that the reliability of the signal will be further enhanced. The code recognition unit responds by grounding the appropriate channel of the audio unit 67 via lines 58, 59 and the electronic cross bar switching unit 56. The audio voice signal and any desired tone or tones are re-transmitted by telephone to the point of interrogation.

The signals passed from the telephone sets 14–17 upon connection to the switching and voice unit 30 set the line holding timer at the commencement of a connection. A message returned from a computer includes a tone signal which resets the line holding timer for only an adequate time duration to permit the computer message to be presented by the audio unit to the interrogator.

This system also includes an actuation device operated by an electro-acoustic transducer. The transducer responds to the tone from the audio unit and operates a solenoid connected to an interlocking device for maintaining the security of a record-keeping device such as a cash register, a time recorder, or a job recorder.

I claim:

1. A credit card evaluation system comprising reading means for reading a first code registered on said credit card and providing an electronic signal in response thereto, means for transmitting said signal from said reading means to means for decoding and translating said first code into a second code, electronic data storage means coupled to said decoding and translating means for retrieving information stored as represented in said second code, means for producing a signal corresponding to said stored information, means coupled to said signal producing means for storing and playing a selected one of a plurality of audio messages in response to said signal, and means for re-transmitting said selected one audio message to an output device associated with said card reading means.

2. A card evaluation system comprising reading means for reading a code registered on said card, said reading means including an encoder for providing a different audio tone for each of several sensors to an acousto-electric transducer adapted to provide an input to a voice grade transmission line, a decoder for responding to a combination of audio tones produced by said encoder, said encoder including means for translating said audio tones into a security code corresponding to said audio tone combination, a switching circuit, means for transmitting said security code to a computer and for retrieving information stored in said computer in response to said security code, said computer further including means for transmitting a response, in response to the retrieved information, through said switching circuit to a voice unit adapted to play a plurality of previously recorded messages in accordance with a predetermined code from said computer, and means for re-transmitting the output of said voice unit to said input to said voice grade transmission line onto an electro-acoustic transducer.

3. A card evaluation system comprising reading means at a first location for reading a first code registered on said card and providing an electronic signal in response thereto, means including a voice-grade transmission link for transmitting said signal from said reading means to remotely located means for decoding and translating said first code into a second code, said last-named means being connected to electronic data storage means for retrieving information stored under said second code, means for transmitting via said link a signal identifying said information, and indicating means at said first location and responsive to said signal for indicating the retrieved information.

4. A system according to claim 3, in which said reading means includes an encoder providing a different pair of audio tones for each of several possible card readings.

5. A system according to claim 4, in which said decoder includes tone-discriminating means and two-tone gate means operative to enable translation into said second code only for a response of said gate means to the received presence of a two-tone signal.

6. A system according to claim 5, in which said decoder includes three-tone gate means operative to suppress operation of the system upon detection of three rather than two simultaneous tones.

* * * * *